(12) United States Patent
Kajiura et al.

(10) Patent No.: US 8,836,270 B2
(45) Date of Patent: Sep. 16, 2014

(54) INVERTER SYSTEM AND COMMUNICATION METHOD

(75) Inventors: Goichi Kajiura, Chiyoda-ku (JP); Masanori Kato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/877,566

(22) PCT Filed: Jun. 18, 2012

(86) PCT No.: PCT/JP2012/065475
§ 371 (c)(1),
(2), (4) Date: Apr. 3, 2013

(87) PCT Pub. No.: WO2013/190609
PCT Pub. Date: Dec. 27, 2013

(65) Prior Publication Data
US 2014/0203756 A1 Jul. 24, 2014

(51) Int. Cl.
*H02P 27/08* (2006.01)
(52) U.S. Cl.
CPC ........................ *H02P 27/08* (2013.01)
USPC ............ 318/812; 318/50; 318/51; 318/53; 318/41; 318/599
(58) Field of Classification Search
CPC ................... H02M 7/48; H02M 7/493
USPC ............... 318/812, 34, 599, 41, 50, 51, 53
See application file for complete search history.

(56) References Cited

U.S. PATENT DOCUMENTS

| | | | | |
|---|---|---|---|---|
| 6,809,678 | B2 * | 10/2004 | Vera et al. | 341/166 |
| 7,259,474 | B2 * | 8/2007 | Blanc | 307/45 |
| 7,773,396 | B2 * | 8/2010 | Ollila et al. | 363/72 |
| 2003/0128007 | A1 | 7/2003 | Fujisaki et al. | |
| 2004/0075600 | A1 * | 4/2004 | Vera et al. | 341/166 |
| 2012/0169311 | A1 * | 7/2012 | Malmberg et al. | 323/272 |

FOREIGN PATENT DOCUMENTS

| | | |
|---|---|---|
| JP | 2003-189654 A | 7/2003 |
| JP | 2005-94933 A | 4/2005 |
| JP | 2006-20374 A | 1/2006 |
| JP | 2007-244009 A | 9/2007 |
| JP | 2007-295647 A | 11/2007 |
| JP | 2008-228548 A | 9/2008 |

OTHER PUBLICATIONS

International Search Report for PCT/JP2012/065475 dated Sep. 18, 2012.

* cited by examiner

*Primary Examiner* — Rita Leykin
(74) *Attorney, Agent, or Firm* — Sughrue Mion, PLLC; Richard C. Turner

(57) ABSTRACT

In an inverter system, a phase adjusting unit configured to adjust, according to reception timing of first data, a phase of second PWM carrier to match a phase of first PWM carrier. A master inverter further includes an amplitude adjusting unit configured to adjust, when second data is received by a communication unit, according to the received second data, amplitude of a first command voltage to balance an actual output current output from a master inverter to the motor and an actual output current output from each of one or more slave inverters to the motor.

10 Claims, 12 Drawing Sheets

INVERTER SYSTEM AND COMMUNICATION METHOD

FIELD

The present invention relates to an inverter system and a communication method.

BACKGROUND

Patent literature 1 describes that, in a serial communication apparatus for motor control in which a host control device and a plurality of motor driving devices are daisy-chain connected, communication timing counters having the same count-up speed are provided on the insides of all the motor driving devices and, when the host control device transmits command data to all the motor driving devices, all the motor driving devices reset the communication timing counters at timing when the command data is normally captured. Consequently, according to Patent Literature 1, all the motor driving devices can simultaneously execute reflection of the command data on control and sampling of feedback data with reference to the communication timing counters. Therefore, when a plurality of motors are caused to operate in cooperation with one another, no deviation occurs among the operations of the motors and highly accurate control can be performed.

CITATION LIST

Patent Literature

Patent Literature 1: Japanese Patent Application Laid-Open No. 2003-189654

SUMMARY

Technical Problem

The technology described in Patent Literature 1 is based on the premise that the motor driving devices respectively drive the separate motors. In other words, in the technology described in Patent Literature 1, a plurality of connections between the motor driving apparatuses and the motors are considered to be independent from one another.

On the other hand, in a configuration in which a master inverter and one or more slave inverters are connected to one motor in parallel via a common connection node, the master inverter and the one or more slave inverters are connected to each other via the common connection node. Therefore, a cross current is likely to flow between the master inverter and the one or more slave inverters.

The present invention has been devised in view of the above and it is an object of the present invention to obtain an inverter system and a communication method that can suppress a cross current between a master inverter and one or more slave inverters.

Solution to Problem

There is provided an inverter system comprising: a master inverter connected to a motor; and one or more slave inverters connected to the master inverter via a half-duplex communication line and each connected to the motor in parallel to the master inverter via a common communication node, wherein the master inverter includes: a driving unit configured to drive the motor based on a first PWM carrier and a first voltage command; and a communication unit configured to broadcast-transmit first data including a current command to the half-duplex communication line in synchronization with the first PWM carrier, each of the one or more slave inverters includes: a driving unit configured to drive the motor based on a second PWM carrier and a second voltage command; a communication unit configured to receive the first data through the half-duplex communication line and broadcast-transmit, in synchronization with the second PWM carrier at timing for avoiding reception timing of the first data, second data including an actual output current output from the slave inverter to the motor to the half-duplex communication line; and a phase adjusting unit configured to adjust, according to the reception timing of the first data, a phase of the second PWM carrier to match a phase of the first PWM carrier, and the master inverter further includes an amplitude adjusting unit configured to adjust, when the second data is received by the communication unit, amplitude of the first voltage command according to the received second data, so as to balance an actual output current output from the master inverter to the motor and an actual output current output from each of the one or more slave inverters to the motor.

Advantageous Effects of Invention

According to the present invention, the phase of the second PWM carrier is adjusted to match the phase of the first PWM carrier. Therefore, it is possible to reduce a phase shift between the first PWM carrier and the second PWM carrier. The amplitude of a first current command is adjusted to balance the actual output current output from the master inverter to the motor and the actual output current output from the slave inverters to the motor. Therefore, it is possible to reduce an amplitude shift between the first voltage command and the second voltage command. Consequently, it is possible to suppress a cross current between the master inverter and the one or more slave inverters.

DESCRIPTION OF EMBODIMENTS

Embodiments of an inverter system according to the present invention are explained in detail below based on the drawings. The present invention is not limited by the embodiments.

First Embodiment

Figure 9:
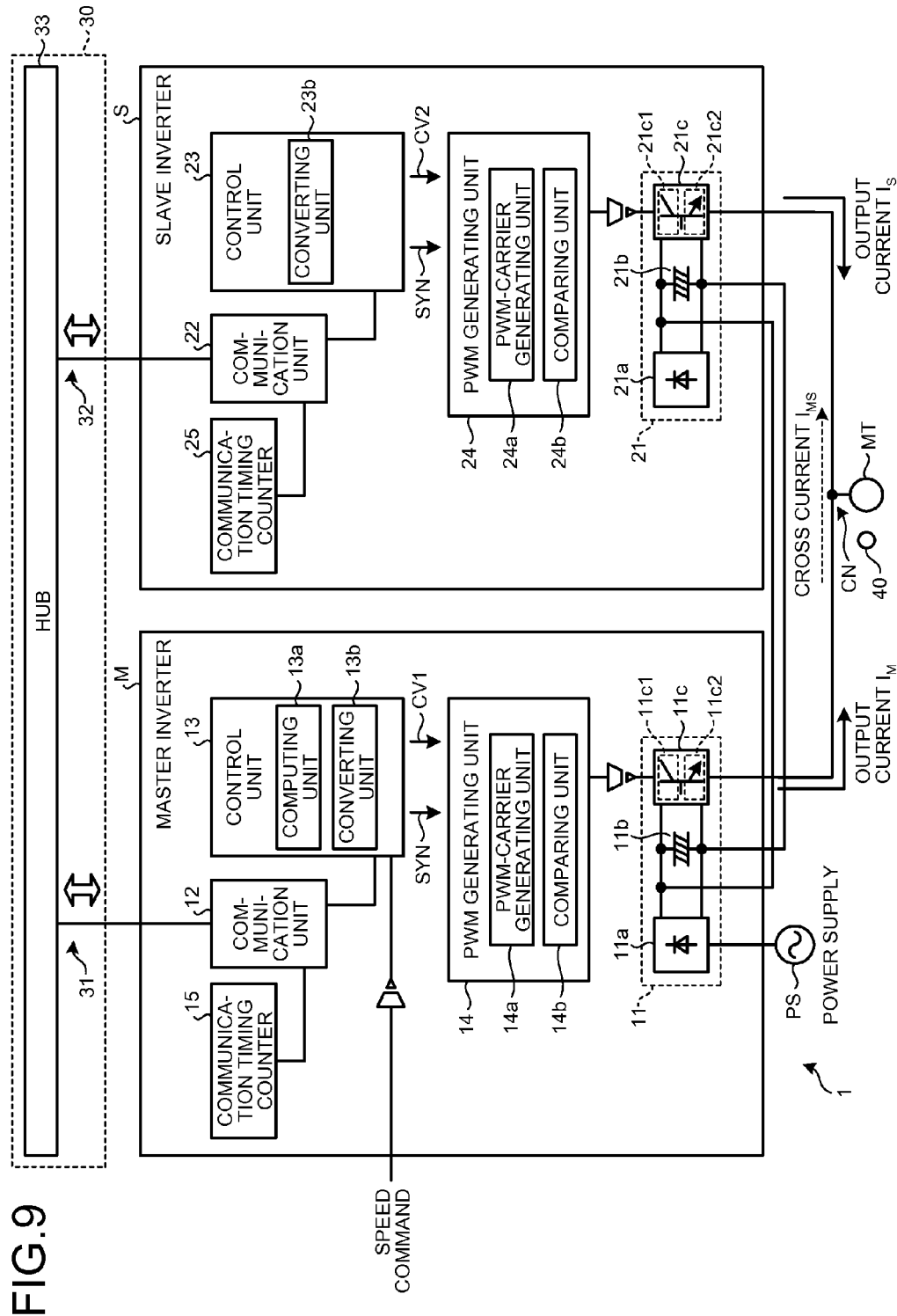
FIG. 9 is a diagram of the configuration of an inverter system according to a basic mode.

Before explaining an inverter system 100 according to a first embodiment, an inverter system 1 according to a basic mode is explained with reference to FIG. 9. FIG. 9 is a diagram of the configuration of the inverter system 1 according to the basic mode.

In general, one motor is driven by one inverter. However, when the capacity of the motor is larger than the capacity of the inverter, for example, when the capacity of the motor is 800 kilowatts and the capacity of the one inverter is 500 kilowatts, it is difficult for the one inverter to properly drive the one motor according to a predetermined command.

On the other hand, as a method of driving a motor having a large capacity, a parallel driving system for connecting outputs of a plurality of inverters in parallel is conceivable. For example, when the capacity of the motor is 800 kilowatts and each of the capacities of two inverters is 500 kilowatts, it is conceivable to connect the two inverters to the motor MT in parallel to thereby enable the two inverters to properly drive the motor MT according to a predetermined command.

Specifically, as shown in FIG. 9, the inverter system 1 includes a master inverter M and a slave inverter S. The master inverter M and the slave inverter S are connected to the motor MT in parallel to each other via a common connection node CN. Consequently, the master inverter M and the slave inverter S drive the motor MT in cooperation with each other. The motor MT is, for example, an induction motor.

As shown in FIG. 9, the master inverter M receives a speed command ω—from the outside (e.g., a host controller). Because the speed command ω* is a command for the entire motor MT, a driving ability corresponding to the speed command ω* needs to be distributed to each of the master inverter M and the slave inverter S. Therefore, the inverter system 1 is configured such that the master inverter M is connected to the slave inverter S via a half-duplex communication line 30 and the master inverter M can inform the slave inverter S of the distributed driving ability.

The half-duplex communication line 30 is a communication line in which collision (data collision) could occur when transmission is performed from a plurality of nodes. The half-duplex communication line 30 includes, for example, a hub 33, a communication line 31 that connects the hub 33 and the master inverter M, and a communication line 32 that connects the hub 33 and the slave inverter S.

More specifically, the master inverter M includes a driving unit 11, a control unit 13, a communication timing counter 15, a communication unit 12, and a PWM generating unit 14.

The driving unit 11 receives a PWM signal from the PWM generating unit 14 and drives the motor MT according to the PWM signal. The driving unit 11 includes, for example, a rectifying unit 11a, a smoothing unit 11b, and an inverter main circuit 11c. The driving unit 11 rectifies, with the rectifying unit 11a, electric power received from an external power supply PS, smoothes the electric power with the smoothing unit 11b to generate direct-current power, and converts, with the inverter main circuit 11c, the direct-current power into alternating-current power according to the PWM signal. The inverter main circuit 11c includes, for example, a plurality of switching elements including switching elements of an upper arm 11c1 and switching elements of a lower arm 11c2. The inverter main circuit 11c turns on and off each of the switching elements at predetermined timing according to the PWM signal to convert the direct-current power into the alternating-current power. The driving unit 11 supplies the converted alternating-current power to the motor MT to drive the motor MT. In FIG. 9, a current component of the alternating-current power supplied from the driving unit 11 to the motor MT is shown as an output current $I_M$.

The control unit 13 generally control the master inverter M. For example, the control unit 13 generates a PWM carrier synchronization signal SYN, which is a reference in generating a PWM carrier, and supplies the PWM carrier synchronization signal SYN to the PWM generating unit 14.

The control unit 13 receives the speed command ω* from the outside (e.g., a host controller) and performs control corresponding to the speed command ω*. For example, the control unit 13 includes a computing unit 13a and a converting unit 13b. The computing unit 13a receives the speed command ω* from the outside and receives actual speed ω from a speed sensor 40. The computing unit 13a converts, for example, a value obtained by subtracting the actual speed ω from the speed command ω* into a total current command I* corresponding to a driving ability for the entire motor MT and divides (e.g., substantially equally) the total current command I* into a current command $I^*_M$ for the master inverter M and a current command $I^*_S$ for the slave inverter S.

Figure 2:
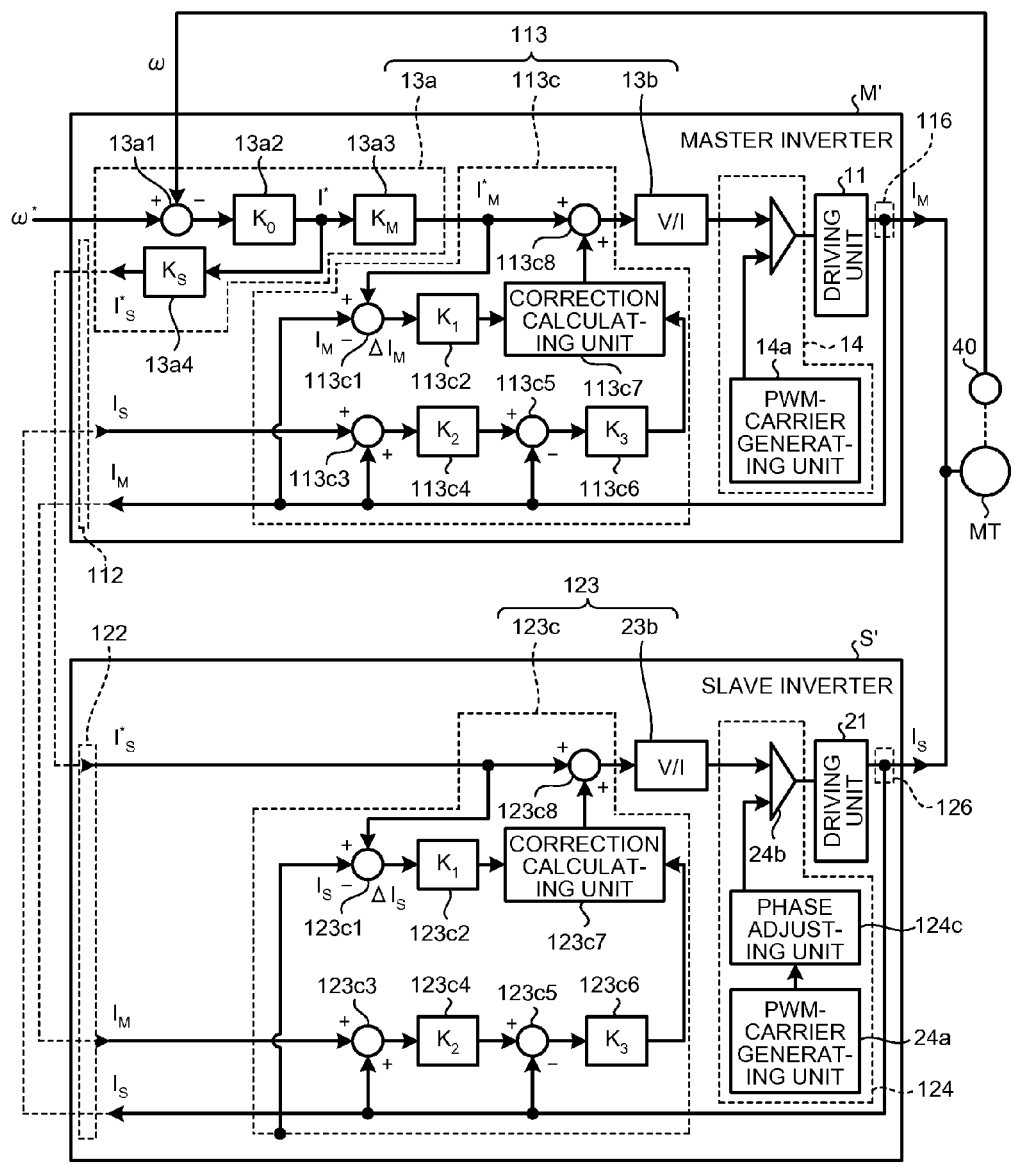
FIG. 2 is a diagram of the configuration of the inverter system according to the first embodiment.

For example, the computing unit 13a includes, as shown in FIG. 2, a subtracter 13a1, a coefficient unit 13a2, a coefficient unit 13a3, and a coefficient unit 13a4. The subtracter 13a1 subtracts the actual speed ω from the speed command ω* to calculate a speed deviation Δω and supplies the speed deviation Δω to the coefficient unit 13a2. The coefficient unit 13a2 multiplies the speed deviation Δω with a coefficient $K_0$ to calculate the total current command I* and supplies the total current command I* to the coefficient unit 13a3 and the coefficient unit 13a4. The coefficient unit 13a3 multiplies the total current command I* with a coefficient $K_M$ to calculate the current command $I^*_M$ for the master inverter M. The coefficient unit 13a4 multiplies the total current command I* with a coefficient $K_S$ to calculate the current command $I^*_S$ for the slave inverter S. FIG. 2 is a figure of the configuration of the inverter system according to the first embodiment. However, because the portion of the computing unit 13a is similar, FIG. 2 is used for the explanation.

The computing unit 13a supplies the current command $I^*_M$ for the master inverter M to the converting unit 13b. The converting unit 13b converts the current command $I^*_M$ for the master inverter M into a first voltage command CV1 and supplies the voltage command CV1 to the PWM generating unit 14.

The control unit 13 generates transmission data including the current command $I^*_S$ for the slave inverter S and supplies the transmission data to the communication unit 12.

The communication timing counter 15 performs a count-up operation in synchronization with a predetermined clock. A count value of the communication timing counter 15 continues to increase until the communication timing counter 15 is reset. The communication timing counter 15 supplies the count value to the communication unit 12.

The communication unit 12 receives the count value from the communication timing counter 15 and receives the transmission data from the control unit 13. When the communication unit 12 determines according to the count value that timing when the transmission data should be transmitted comes, the communication unit 12 broadcast-transmits the transmission data to the half-duplex communication line 30.

The PWM generating unit 14 receives the PWM carrier synchronization signal SYN and the first voltage command CV1 from the control unit 13 and generates a PWM signal using the PWM carrier synchronization signal SYN and the first voltage command CV1. For example, the PWM generating unit 14 includes a PWM-carrier generating unit 14a and a comparing unit 14b. The PWM-carrier generating unit 14a generates, according to the PWM carrier synchronization signal SYN, a first PWM carrier having a predetermined period.

The comparing unit 14b receives the first PWM carrier from the PWM-carrier generating unit 14a and receives the first voltage command CV1 from the control unit 13. The comparing unit 14b compares the first PWM carrier and the first voltage command CV1, generates a PWM signal corresponding to a comparison result, and supplies the PWM signal to the inverter main circuit 11c. Consequently, the driving unit 11 receives the PWM signal generated based on the first PWM carrier and the first voltage command CV1, converts direct-current power into alternating-current power according to the PWM signal, and supplies the alternating-current power to the motor MT. That is, the driving unit 11 drives the motor MT based on the first PWM carrier and the first voltage command.

Figure 10:
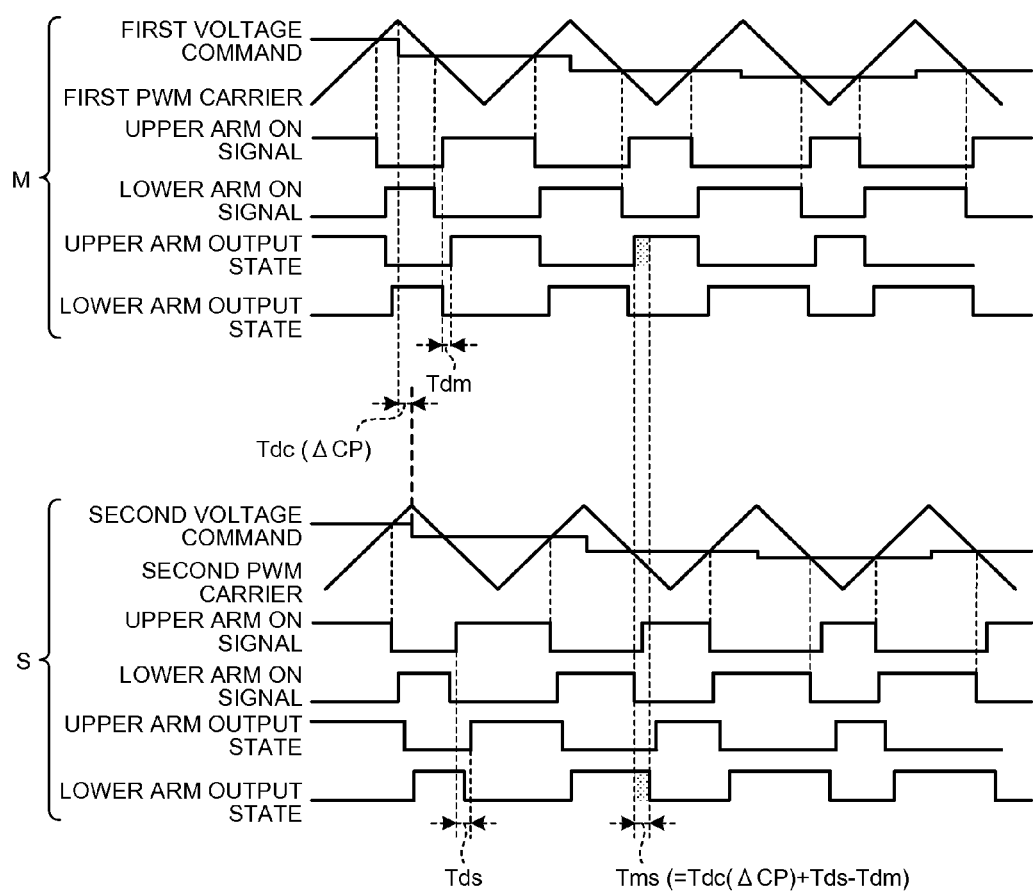
FIG. 10 is a diagram of the operation of the inverter system according to the basic mode.

For example, as shown in FIG. 10, at timing when the first PWM carrier exceeds the first command voltage, the comparing unit 14b changes an upper arm ON signal, which is a PWM signal for an upper arm 21c1, from an ON level to an OFF level. At timing immediately after the timing, the comparing unit 14b changes a lower arm ON signal, which is a PWM signal for a lower arm 21c2, from the OFF level to the ON level. At timing when the first PWM carrier falls below the first command voltage, the comparing unit 14b changes the lower arm ON signal from the ON level to the OFF level. At timing immediately after the timing, the comparing unit 14b changes the upper arm ON signal from the OFF level to the ON level. According to the change of the upper arm ON signal and the lower arm ON signal, the inverter main circuit 11c supplies the alternating-current power to the motor MT such that, for example, a switching element of the upper arm 21c1 and a switching element of the lower arm 21c2 respectively perform switching operations corresponding to the PWM signal as an upper arm output state and a lower arm output state shown in FIG. 10.

On the other hand, the slave inverter S shown in FIG. 9 includes a driving unit 21, a communication timing counter 25, a communication unit 22, a control unit 23, and a PWM generating unit 24.

The driving unit 21 receives a PWM signal from the PWM generating unit 24 and drives the motor MT according to the PWM signal. The driving unit 21 includes, for example, a rectifying unit 21a, a smoothing unit 21b, and an inverter main circuit 21c. The driving unit 21 rectifies, with the rectifying unit 21a, electric power received from the external power supply PS, smoothes the electric power with the rectifying unit 21a to generate direct-current power, and converts, with the inverter main circuit 21c, the direct-current power into alternating-current power according to the PWM signal. The inverter main circuit 21c includes, for example, a plurality of switching elements including the switching element of the upper arm 21c1 and the switching element of the lower arm 21c2. The inverter main circuit 21c turns on and off each of the switching elements at predetermined timing according to the PWM signal to convert the direct-current power into the alternating-current power. The driving unit 21 supplies the converted alternating-current power to the motor MT to drive the motor MT. In FIG. 9, a current component of the alternating-current power supplied from the driving unit 21 to the motor MT is shown as an output current $I_S$.

The communication timing counter 25 performs a count-up operation in synchronization with a predetermined clock. A count value of the communication timing counter 25 continues to increase until the communication timing counter 25 is reset. The communication timing counter 25 can supply the count value to the communication unit 22.

The communication unit 22 receives data including the current command $I^*_S$ for the slave inverter S from the master inverter M through the half-duplex communication line 30. The communication unit 22 supplies data including the current command $I^*_S$ for the slave inverter S to the control unit 23. The communication unit 22 can receive the count value from the communication timing counter 25 or can broadcast-transmit predetermined transmission data to the half-duplex communication line 30 according to the count value.

The control unit 23 generally controls the slave inverter S. For example, the control unit 23 generates the PWM carrier synchronization signal SYN, which is a reference in generating a PWM carrier, and supplies the PWM carrier synchronization signal SYN to the PWM-generating unit 24.

The control unit 23 receives the data including the current command $I^*_S$ for the slave inverter S from the communication unit 22 and performs control corresponding to the current command $I^*_S$. For example, the control unit 23 includes a converting unit 23b. The converting unit 23b converts the current command $I^*_S$ for the slave inverter S into a second voltage command CV2 and supplies the second voltage command CV2 to the PWM generating unit 24.

The control unit 23 can generate predetermined transmission data and supply the predetermined data to the communication unit 22.

The PWM generating unit 24 receives the PWM carrier synchronization signal SYN and the second voltage command CV2 from the control unit 23 and generates a PWM signal using the PWM carrier synchronization signal SYN and the second voltage command CV2. For example, the PWM generating unit 24 includes a PWM-carrier generating unit 24a and a comparing unit 24b. The PWM-carrier generating unit 24a generates, according to the PWM carrier synchronization signal SYN, a second PWM carrier having a predetermined period.

The comparing unit 24b receives the second PWM carrier from the PWM-carrier generating unit 24a and receives the second voltage command CV2 from the control unit 23. The comparing unit 24b compares the second PWM carrier and the second voltage command CV2, generates a PWM signal corresponding to a comparison result, and supplies the PWM signal to the inverter main circuit 21c. Consequently, the driving unit 21 receives the PWM signal generated based on the second PWM carrier and the second voltage command, converts direct-current power into alternating-current power according to the PWM signal, and supplies the alternating-current power to the motor MT. That is, the driving unit 21 drives the motor MT based on the second PWM carrier and the second voltage command.

For example, as shown in FIG. 10, at timing when the second PWM carrier exceeds the second command voltage, the comparing unit 24b changes the upper arm ON signal, which is the PWM signal for the upper arm 21c1, from the ON level to the OFF level. At timing immediately after the timing, the comparing unit 24b changes the lower arm ON signal, which is the PWM signal for the lower arm 21c2, from the OFF level to the ON level. At timing when the second PWM carrier falls below the second command voltage, the comparing unit 24b changes the lower arm ON signal from the ON level to the OFF level. At timing immediately after the timing, the comparing unit 24b changes the upper arm ON signal from the OFF level to the ON level. According to the change of the upper arm ON signal and the lower arm ON signal, the inverter main circuit 21c supplies the alternating-current power to the motor MT such that, for example, the switching element of the upper arm 21c1 and the switching element of the lower arm 21c2 respectively perform switching operations corresponding to the PWM signal as the upper arm output state and the lower arm output state shown in FIG. 10.

In a configuration in which the master inverter M and the slave inverter S are connected to one motor MT in parallel via the common connection node CN, the master inverter M and the slave inverter S are connected to each other via the common connection node CN. Therefore, there is a possibility that a cross current flows between the master inverter M and the slave inverter S.

For example, when a cross current $I_{MS}$ flows from the master inverter M to the slave inverter S as shown in FIG. 9, power supply from the master inverter M to the motor MT decreases and power supply from the slave inverter S to the motor MT is hindered. Therefore, it is difficult for the master inverter M and the slave inverter S to properly drive the motor MT according to the speed command $\omega^*$.

Figure 12:
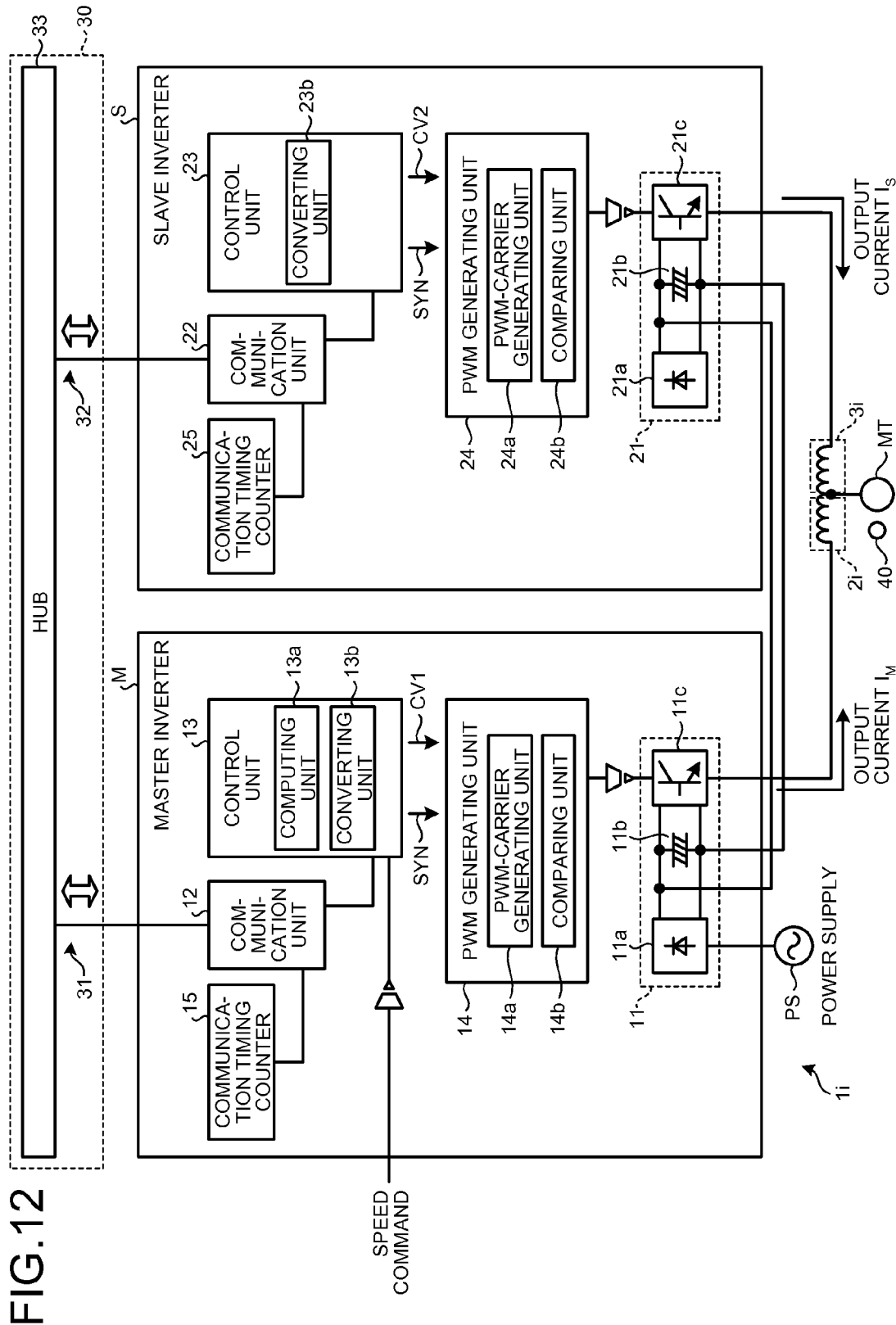
FIG. 12 is a diagram of the configuration of an inverter system according to a modification of the basic mode.

To suppress the cross current, as shown in FIG. 12, it is conceivable to connect, in an inverter system 11, the master inverter M and the slave inverter S and the motor MT via coupling reactors 2i and 3i wound in oppositely from each other. In this configuration, impedance between the master inverter M and the slave inverter S is increased to realize suppression of a cross current.

However, when each of the master inverter M and the slave inverter S supplies three-phase alternating-current power to the motor MT, because coupling reactors for joining the three-phase alternating-current power are large and expensive, manufacturing costs for the inverter system 1i tends to increase. In the inverter system 1i, to increase the number of inverters connected in parallel, it is necessary to provide coupling reactors having extremely complicated structure between the inverters and the motor. Therefore, the manufacturing costs for the inverter system 1i tends to further increase.

Figure 11:
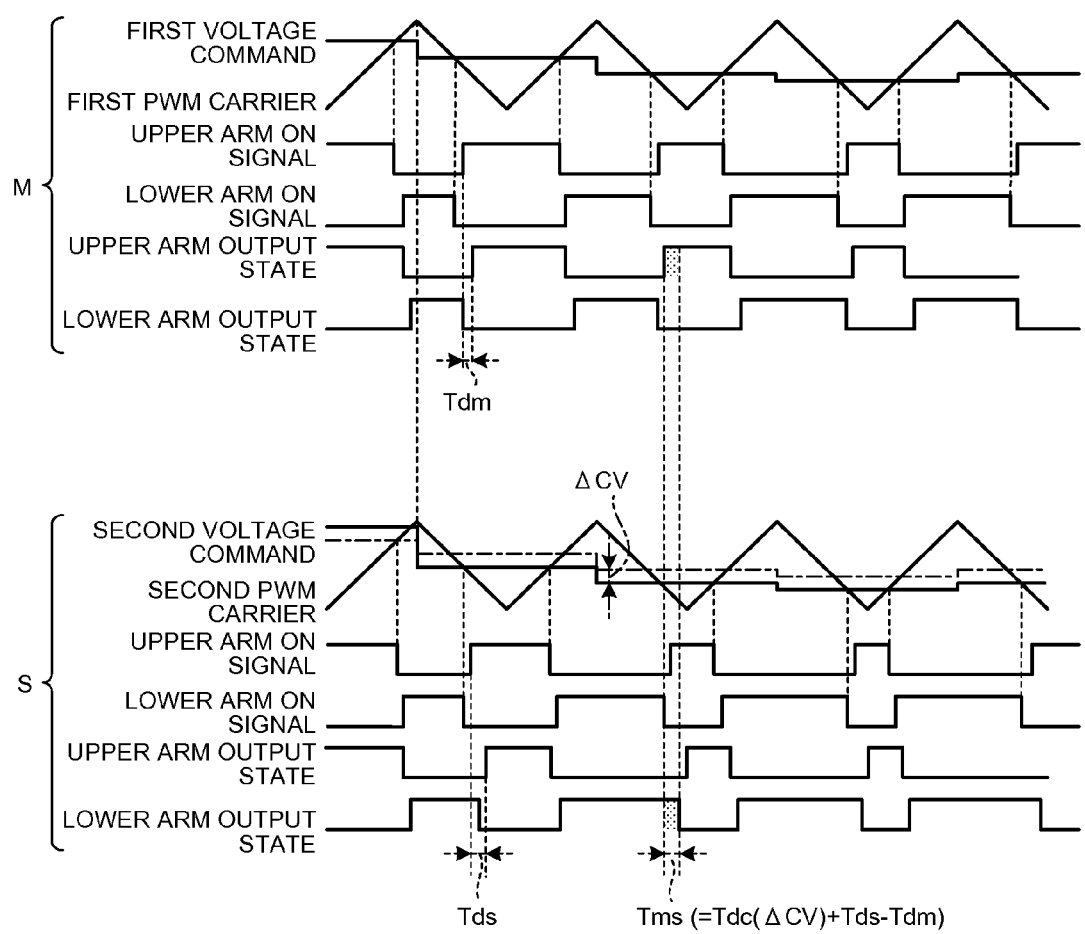
FIG. 11 is a diagram of the operation of the inverter system according to the basic mode.

Therefore, as shown in FIGS. 10 and 11, the inventor examined whether a cross current can be suppressed without using the coupling reactors.

For example, as shown in FIG. 10, between the master inverter M and the slave inverter S, there is often a difference between output delay times Tdm and Tds because of fluctuation in an element characteristic of each of the master inverter M and the slave inverter S. In addition to this output delay difference, if a time shift Tdc($\Delta$CP) corresponding to a phase shift $\Delta$CP is large between the first PWM carrier used in the master inverter M and the second PWM carrier used in the slave inverter S, a cross current is likely to flow between the master inverter M and the slave inverter S via the common connection node CN. That is, in a cross current induced period Tms, the upper arm 11c1 of the master inverter M is ON and, at the same time, the lower arm 21c1 of the slave inverter S is ON. Therefore, as indicated by a broken line arrow in FIG. 9, the cross current $I_{MS}$ tends to flow from the master inverter M to the slave inverter S through the common connection node CN. The cross current induced period Tms tends to be longer as the phase shift $\Delta$CP between the first PWM carrier and the second PWM carrier is larger as indicated by Formula 1 below.

$$Tms=Tdc(\Delta CP)+Tds-Tdm \qquad \text{Formula 1}$$

Alternatively, for example, as shown in FIG. 11, in addition to the output delay difference between the master inverter M and the slave inverter S, if the time shift Tdc($\Delta$CP) corresponding to the phase shift $\Delta$CP is large between the first voltage command used in the master inverter M and the second voltage command used in the slave inverter S, a cross current is likely to flow between the master inverter M and the slave inverter S via the common connection node CN. Specifically, in the cross current induced period Tms shown in FIG. 11, the upper arm 11c1 of the master inverter M is ON and, at the same time, the lower arm 21c1 of the slave inverter S is ON. Therefore, as indicated by the broken line arrow in FIG. 9, the cross current $I_{MS}$ tends to flow from the master inverter M to the slave inverter S through the common connection node CN. The cross current induced period Tms tends to be longer as an amplitude shift $\Delta$CV between the first voltage command and the second voltage command is larger as indicated by Formula 2 below.

$$Tms=Tdc(\Delta CV)+Tds-Tdm \qquad \text{Formula 2}$$

That is, the inventor found that, to reduce the cross current induced period Tms and suppress the cross current $I_{MS}$, it is necessary to reduce the phase shift $\Delta$CP between the first PWM carrier and the second PWM carrier and reduce the amplitude shift $\Delta$CV between the first voltage command and the second voltage command.

Therefore, in this embodiment, adjustment for matching the phase of the first PWM carrier and the phase of the second PWM carrier is performed. Further, at least one of the first voltage command and the second voltage command is adjusted to balance an actual output current $I_M$ output from a master inverter M' to the motor MT and an actual output current $I_S$ output from a slave inverter S' to the motor MT. In this way, this embodiment aims at accurately synchronizing switching operations of the inverters and suppressing a cross current.

Figure 1:
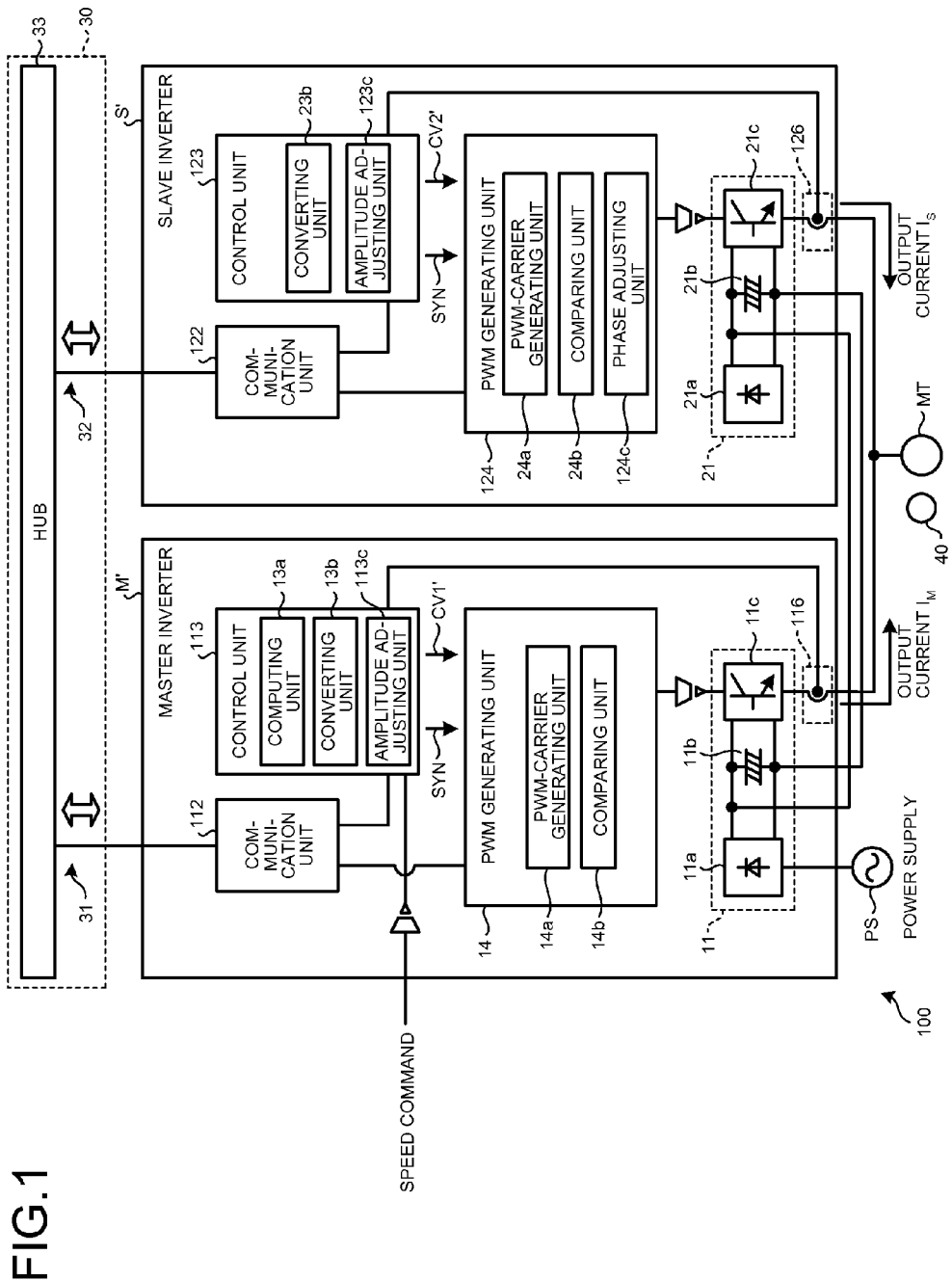
FIG. 1 is a diagram of the configuration of an inverter system according to a first embodiment.

Specifically, as shown in FIG. 1, an inverter system 100 includes the master inverter M' and the slave inverter S'. FIG. 1 is a diagram of the configuration of the inverter system 100. Differences from the basic mode are mainly explained below.

In this embodiment, a communication system is changed to match the phase of the first PWM carrier and the phase of the second PWM carrier.

In the basic mode, because the master inverter M and the slave inverter S are connected via the half-duplex communication line 30, collision (data collision) is likely to occur when transmission is performed from the master inverter M and the slave inverter S. When collision is likely to occur, in the half-duplex communication line 30, for example, if the hub 33 is a repeater hub, collision is detected to perform retransmission processing for data. For example, if the hub 33 is a switching hub, likelihood of collision is detected to perform arbitration processing. If the retransmission processing or the arbitrary processing is performed, when data for matching the phase of the first PWM carrier and the phase of the second PWM carrier is transmitted from the master inverter M to the slave inverter S, a time lag occurs between transmission timing on the master inverter M side and reception timing on the slave inverter S side. As a result, it is difficult to match the phase of the first PWM carrier and the phase of the second PWM carrier.

Figure 3:
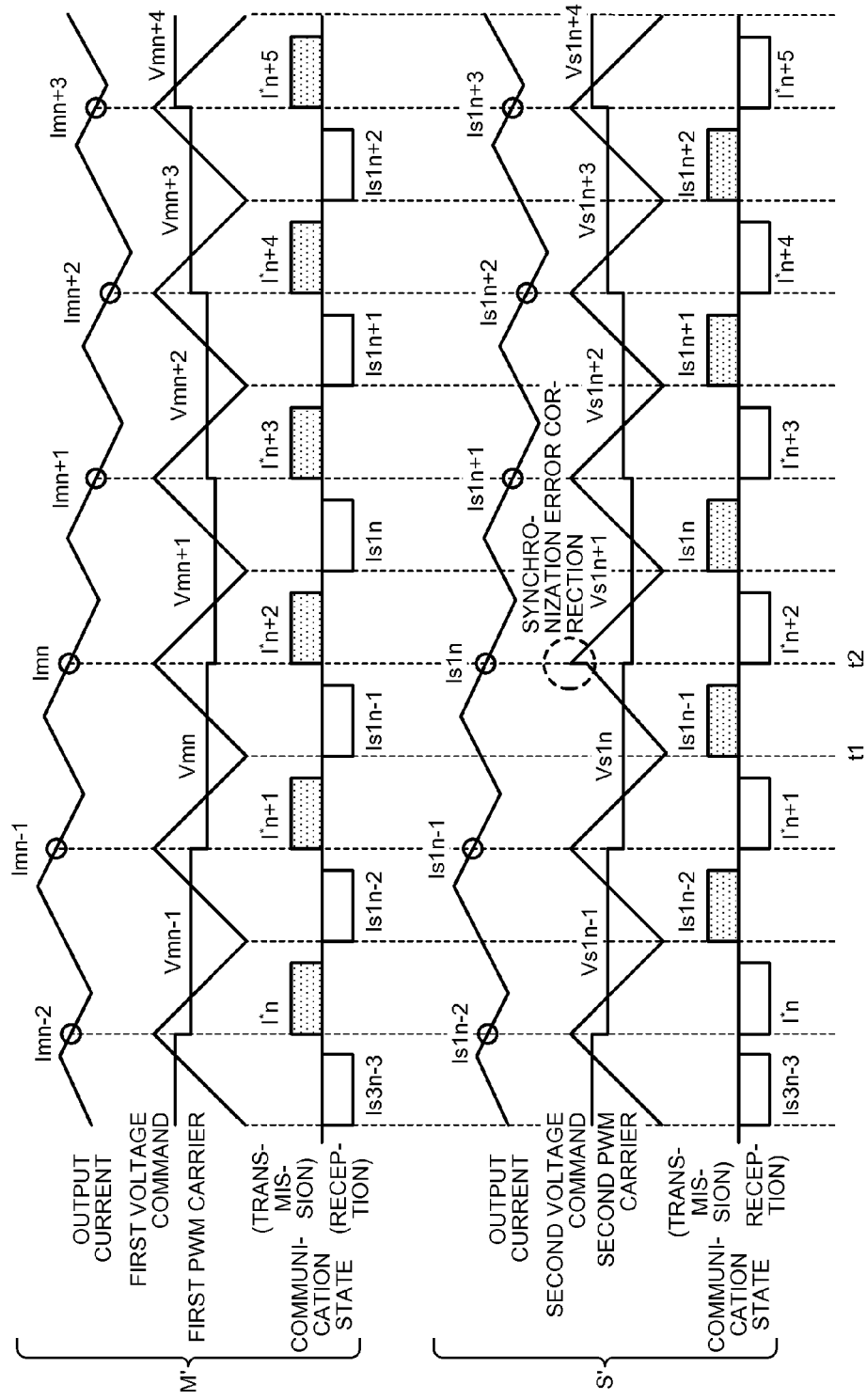
FIG. 3 is a diagram of the operation of the inverter system according to the first embodiment.

On the other hand, in this embodiment, transmission of data by a communication unit 112 of the master inverter M' and transmission of data by a communication unit 122 of the slave inverter S' are performed in a time division manner (see FIG. 3). Consequently, it is possible to prevent the occurrence of a time lag. When the transmissions of data are performed in a time division manner, it is necessary to synchronize signals serving as references for transmission timing for data by the communication unit 112 of the master inverter M' and transmission timing for data by the communication unit 122 of the slave inverter S'.

In the basic mode, signals serving as references for transmission timing for data by the communication unit 12 of the master inverter M and transmission timing for data by the communication unit 22 of the slave inverter S are count values of the communication timing counters 15 and 25. To match the phase of the first PWM carrier and the phase of the second PWM carrier, two stages of adjustment are necessary, i.e., adjustment for matching the phases and the periods of predetermined clocks for causing the communication timing counters 15 and 25 to operate is performed and then adjustment for matching the phase of the first PWM carrier and the phase of the second PWM carrier is performed. Consequently, in the inverter system 1, processing time for matching the phase of the first PWM carrier and the phase of the second PWM carrier tends to increase and it is difficult to secure a real time property of motor control.

On the other hand, in this embodiment, the communication unit 112 of the master inverter M' receives the first PWM carrier from the PWM generating unit 14 and, in synchronization with a first phase (e.g., a peak of the carrier) in the first PWM carrier, broadcast-transmits first data including the current command $I^*_S$ for the slave inverter S to the half-duplex communication line 30 (see FIG. 3). In response to the transmission of the first data, the communication unit 122 of the slave inverter S' receives the first data through the half-duplex communication line 30 and, in synchronization with the second PWM carrier, broadcast-transmits second data to the half-duplex communication line 30 at timing for avoiding reception timing of the first data. That is, the communication unit 122 of the slave inverter S' receives the second PWM carrier after the adjustment from a PWM generating unit 124 and, in synchronization with a second phase (e.g., a valley of the carrier) in the second PWM carrier, broadcast-transmits the second data to the half-duplex communication line 30 (see FIG. 3). Consequently, it is possible to avoid collision (data collision) of the first data and the second data in the half-duplex communication line 30. The communication unit 122 of the slave inverter S' can receive the first data, which is transmitted from the master inverter M', on a real time basis through the half-duplex communication line 30.

The PWM generating unit 124 of the slave inverter S' further includes a phase adjusting unit 124c. The phase adjusting unit 124c receives the first data, which is received by the communication unit 122, on a real time basis through a control unit 123 and adjusts, according to reception timing of the first data, the phase of the second PWM carrier to match the phase of the first PWM carrier. That is, because the first data is transmitted in synchronization with the first phase (e.g., the peak of the carrier) in the first PWM carrier on the master inverter M' side, the phase adjusting unit 124c adjusts the phase of the second PWM carrier to be the first phase (e.g., the peak of the carrier) at reception timing of the first data.

For example, in FIG. 3, a phase shift occurs between the first PWM carrier and the second PWM carrier in the vicinity of timing t1. However, the phase adjusting unit 124c of the slave inverter S' forcibly adjusts the phase of the second PWM carrier to the first phase (e.g., the peak of the carrier) at timing t2 when first data "I*n+2" is received. Consequently, at timing t2 and subsequent timings, it is possible to match the phase of the first PWM carrier and the phase of the second PWM carrier.

In this embodiment, contrivance explained below is carried out to adjust at least one of the first voltage command and the second voltage command to balance the actual output current $I_M$ output from the master inverter M' to the motor MT and the actual output current $I_S$ output from the slave inverter S' to the motor MT.

The slave inverter S' further includes a current sensor 126. The current sensor 126 detects the actual output current $I_S$ output from the slave inverter S' to the motor MT and supplies the actual output current $I_S$ to the control unit 123. The control unit 123 generates second data including the actual output current $I_S$ output from the slave inverter S' to the motor MT and supplies the second data to the communication unit 122. The communication unit 122 broadcast-transmits the second data to the half-duplex communication line 30 in synchronization with the second phase (e.g., the valley of the carrier) in the second PWM carrier (see FIG. 3).

The master inverter M' further includes a current sensor 116. A control unit 113 of the master inverter M' further includes an amplitude adjusting unit 113c. The current sensor 116 detects the actual output current $I_M$ output from the master inverter M' to the motor MT and supplies the actual output current $I_M$ to the control unit 113. The amplitude adjusting unit 113c receives the actual output current $I_M$ from the current sensor 116. When the second data is received by the communication unit 112, the amplitude adjusting unit 113c receives the second data from the communication unit 112. The amplitude adjusting unit 113c recognizes, according to the second data, the actual output current $I_S$ output from the slave inverter S' to the motor MT. The amplitude adjusting unit 113c adjusts the first voltage command CV1 to balance the actual output current $I_M$ output from the master inverter M' to the motor MT and the actual output current $I_S$ output from the slave inverter S' to the motor MT.

For example, the amplitude adjusting unit 113c receives, from the computing unit 13a, the current command $I^*_M$ that should be the first voltage command CV1 when converted by the converting unit 13b. The amplitude adjusting unit 113c adjusts, according to the actual output current $I_M$ and the actual output current $I_S$, the current command $I^*_M$ to substantially equalize the amplitude of an actual output voltage output from the master inverter M' to the motor MT and the amplitude of an actual output voltage output from the slave inverter S' to the motor MT and supplies the current command $I^*_M$ to the converting unit 13b. The converting unit 13b receives a current command $I^*_M{}'$ after the adjustment from the amplitude adjusting unit 113c, converts the current command $I^*_M{}'$ after the adjustment into a first voltage command CV1', and supplies the first voltage command CV1' to the PWM generating unit 14. That is, the amplitude adjusting unit 113c adjusts the current command $I^*_M$ corresponding to the first voltage command CV1 to indirectly adjust the first voltage command CV1 and generates the first voltage command CV1' after the adjustment.

For example, the amplitude adjusting unit 113c includes, as shown in FIG. 2, a subtracter 113c1, a coefficient unit 113c2, an adder 113c3, a coefficient unit 113c4, a subtracter 113c5, a coefficient unit 113c6, a correction calculating unit 113c7, and an adder 113c8. The subtracter 113c1 subtracts the actual output current $I_M$ from the current command $I^*_M$ to calculate a current deviation $\Delta I_M$ and supplies the current deviation $\Delta I_M$ to the coefficient unit 113c2. The coefficient unit 113c2 multiplies the current deviation $\Delta I_M$ with a coefficient $K_1$ and supplies $K_1 \Delta I_M$ to the correction calculating unit 113c7. The adder 113c3 adds the actual output current $I_M$ to the actual output current $I_S$ and supplies an actual output current $(I_M+I_S)$ to the coefficient unit 113c4. The coefficient unit 113c4 multiplies the actual output current $(I_M+I_S)$ with a coefficient $K_2$ and supplies $K_2(I_M+I_S)$ to the subtracter 113c5. The subtracter 113c5 subtracts the actual output current $I_M$ from $K_2(I_M+I_S)$ and supplies $((K_2-1)I_M+K_2I_S)$ to the coefficient unit 113c6. The coefficient unit 113c6 multiplies $((K_2-1)I_M+K_2I_S)$ with a coefficient $K_3$ and supplies $K_3((K_2-1)I_M+K_2I_S)$ to the correction calculating unit 113c7. The correction calculating unit 113c7 calculates, according to $K_1\Delta I_M$ and $K_3((K_2-1)I_M+K_2I_S)$, a correction amount $\Delta CI_M$ for cancelling an amplitude shift and supplies the correction amount $\Delta CI_M$ to the adder 113c8. The adder 113c8 adds the correction amount $\Delta CI_M$ to the current command $I^*_M$ and calculates an adjusted current command $I^*_M{}' (=I^*_M+\Delta CI_M)$.

The control unit 113 of the master inverter M' generates first data including the actual output current $I_M$ output from the master inverter M' to the motor MT in addition to the current command $I^*_S$ for the slave inverter S' and supplies the first data to the communication unit 112. The communication unit 112 broadcast-transmits the first data to the half-duplex communication line 30 in synchronization with the first phase (e.g., the peak of the carrier) in the first PWM carrier (see FIG. 3).

The control unit 123 of the slave inverter S' further includes an amplitude adjusting unit 123c. The current sensor 126 detects the actual output current $I_S$ output from the slave inverter S' to the motor MT and supplies the actual output current $I_S$ to the control unit 123. The amplitude adjusting unit 123c receives the actual output current $I_S$ from the current sensor 126. When the first data is received by the communication unit 122, the amplitude adjusting unit 123c receives the first data from the communication unit 122. The amplitude adjusting unit 123c recognizes, according to the first data, the actual output current $I_M$ output from the master inverter M' to the motor MT. The amplitude adjusting unit 123c adjusts the second voltage command CV2 to balance the actual output current $I_M$ output from the master inverter M' to the motor MT and the actual output current $I_S$ output from the slave inverter S' to the motor MT.

For example, the amplitude adjusting unit 123c receives, from the computing unit 13a, the current command $I^*_S$ that should be the second voltage command CV2 when converted by the converting unit 23b. The amplitude adjusting unit 123c adjusts, according to the actual output current $I_M$ and the actual output current $I_S$, the current command $I^*_S$ to equalize the amplitude of an actual output voltage output from the master inverter M' to the motor MT and the amplitude of an actual output voltage output from the slave inverter S' to the motor MT and supplies the current command $I^*_S$ to the converting unit 23b. The converting unit 23b receives a current command $I^*_S{}'$ after the adjustment from the amplitude adjusting unit 123c, converts the current command $I^*_S{}'$ after the adjustment into a second voltage command CV2', and supplies the second voltage command CV2' to the PWM generating unit 124. That is, the amplitude adjusting unit 123c adjusts the current command $I^*_S$ corresponding to the second voltage command CV2 to indirectly adjust the second voltage command CV2 and generates the second voltage command CV2' after the adjustment.

For example, the amplitude adjusting unit 123c includes, as shown in FIG. 2, a subtracter 123c1, a coefficient unit 123c2, an adder 123c3, a coefficient unit 123c4, a subtracter 123c5, a coefficient unit 123c6, a correction calculating unit 123c7, and an adder 123c8. The subtracter 123c1 subtracts the actual output current $I_S$ from the current command $I^*_S$ to calculate a current deviation $\Delta I_S$ and supplies the current deviation $\Delta I_S$ to the coefficient unit 123c2. The coefficient unit 123c2 multiplies the current deviation $\Delta I_S$ with the coefficient $K_1$ and supplies $K_1\Delta I_S$ to the correction calculating unit 123c7. The adder 123c3 adds the actual output current $I_S$ to the actual output current $I_M$ and supplies an actual output current $(I_M+I_S)$ to the coefficient unit 123c4. The coefficient unit 123c4 multiplies the actual output current $(I_M+I_S)$ with the coefficient $K_2$ and supplies $K_2(I_M+I_S)$ to the subtracter 123c5. The subtracter 123c5 subtracts the actual output current I from $K_2(I_M+I_S)$ and supplies $(K_2I_M+(K_2-1)I_S)$ to the coefficient unit 123c6. The coefficient unit 123c6 multiplies $(K_2I_M+(K_2-1)I_S)$ with the coefficient $K_3$ and supplies $K_3(K_2I_M+(K_2-1)I_S)$ to the correction calculating unit 123c7. The correction calculating unit 123c7 calculates, according to $K_1\Delta I_S$ and $K_3(K_2I_M+(K_2-1)I_S)$, a correction amount $\Delta CI_S$ for cancelling an amplitude shift and supplies the correction amount $\Delta CI_S$ to the adder 123c8. The adder 123c8 adds the correction amount $\Delta CI_S$ to the current command $I^*_S$ to calculate an adjusted current command $I^*_S{}' (=I^*_S+\Delta CI_S)$.

Figure 4:
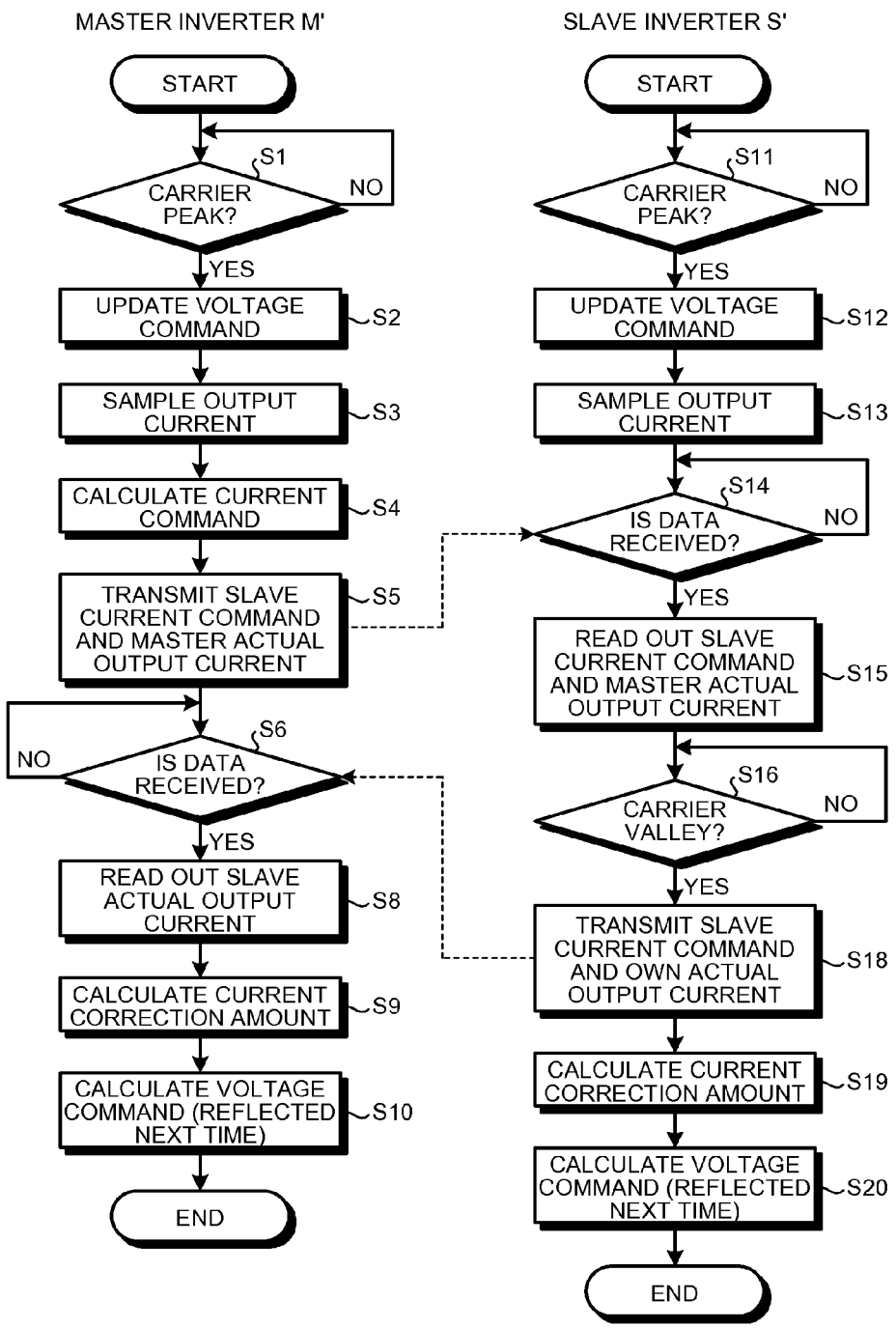
FIG. 4 is a flowchart for explaining the operation of the inverter system according to the first embodiment.

The operation of the inverter system 100 is explained with reference to FIG. 4. FIG. 4 is a flowchart for explaining the operation of the inverter system 100.

The master inverter M' stays on standby ("N" at step S1) until the phase of the first PWM carrier changes to the first phase (e.g., the peak of the carrier). When the phase of the first PWM carrier changes to the first phase (e.g., the peak of the carrier) ("Y" at step S1), the master inverter M' updates the first voltage command (step S2), samples an output current (step S3), calculates a current command (step S4), and broadcast-transmits the first data including the current command $I^*_S$ for the slave inverter S' and the actual output current $I_M$ output from the master inverter M' to the motor MT to the half-duplex communication line 30 (step S5). Thereafter, the master inverter M' stays on standby ("N" at step S6) until second data is received.

On the other hand, the slave inverter S' stays on standby ("N" at step S11) until the phase of the second PWM carrier changes to the first phase (e.g., the peak of the carrier). When the phase of the second PWM carrier changes to the first phase (e.g., the peak of the carrier) ("Y" at step S11), the slave inverter S' updates the second voltage command (step S12), samples an output current (step S13), and stays on standby ("N" at step S14) until the first data is received.

Upon receiving the first data ("Y" at step S14), the slave inverter S' adjusts the phase of the second PWM carrier to be the first phase (e.g., the peak of the carrier) and reads out, from the first data, the current command $I^*_S$ for the slave inverter S' and the actual output current $I_M$ output from the master inverter M' to the motor MT (step S15).

The slave inverter S' stays on standby ("N" at step S16) until the phase of the second PWM carrier changes to the second phase (e.g., the valley of the carrier). When the phase of the second PWM carrier changes to the second phase (e.g., the valley of the carrier) ("Y" at step S16), the slave inverter S' broadcast-transmits the second data including the actual output current $I_S$ output from the slave inverter S' to the motor MT to the half-duplex communication line 30 (step S18). Thereafter, the slave inverter S' calculates, according to the current command $I^*_S$ for the slave inverter S' and the actual output current $I_M$ output from the master inverter M' to the motor MT, which are read out at step S15, a current correction amount for adjusting the second voltage command to balance the actual output current $I_M$ output from the master inverter M' to the motor MT and the actual output current $I_S$ output from the slave inverter S' to the motor MT (step S19), corrects the current command with the current command amount, and converts the current command into a second voltage command such that the voltage command is updated at step S12 next time (step S20).

On the other hand, upon receiving the second data ("Y" at step S6), the master inverter M' reads out, from the second data, the actual output current $I_S$ output from the slave inverter S' to the motor MT (step S8). Thereafter, the master inverter M' calculates, according to the actual output current $I_S$ output from the slave inverter S' to the motor MT, a current correction amount for adjusting the first voltage command to balance the actual output current $I_M$ output from the master inverter M' to the motor MT and the actual output current $I_S$ output from the slave inverter S' to the motor MT (step S9), corrects the current command with the current correction amount, and converts the current command into the first voltage command such that the voltage command is updated at step S2 next time (step S10).

As explained above, in the first embodiment, the communication unit 112 of the master inverter M' broadcast-transmits the first data including the current command to the half-duplex communication line 30 in synchronization with the first PWM carrier. The communication unit 122 of the slave inverter S' receives the first data through the half-duplex communication line 30. The phase adjusting unit 124c of the slave inverter S' adjusts, according to reception timing of the first data, the phase of the second PWM carrier to match the phase of the first PWM carrier. Consequently, it is possible to reduce a phase shift between the first PWM carrier and the second PWM carrier. The communication unit 122 of the slave inverter S' broadcast-transmits, in synchronization with the second PWM carrier, the second data including the actual output current output from the slave inverter to the motor to the half-duplex communication line 30 at timing for avoiding the reception timing of the first data. When the second data is received by the communication unit 112, the amplitude adjusting unit 113c of the master inverter M' adjusts, according to the received second data, the amplitude of the first voltage command to balance the actual output current output from the master inverter to the motor and the actual output current output from the slave inverter to the motor. Consequently, it is possible to reduce an amplitude shift between the first voltage command and the second voltage command. That is, it is possible to reduce a phase shift between the first PWM carrier and the second PWM carrier and reduce an amplitude shift between the first voltage command and the second voltage command. Therefore, it is possible to accurately synchronize switching operations in the inverter main circuits of the master inverter M' and the slave inverter S', reduce the length of the cross current induced period Tms (see FIGS. 10 and 11) (e.g., suppress the length to be extremely small), and suppress a cross current between the master inverter M' and the slave inverter S' without using coupling reactors.

In the first embodiment, the communication unit 112 of the master inverter M' broadcast-transmits the first data to the half-duplex communication line 30 in synchronization with the first phase (e.g., the peak of the carrier) in the first PWM carrier. The phase adjusting unit 124c of the slave inverter S' adjusts, according to the reception timing of the first data, the phase of the second PWM carrier to be the first phase (e.g., the peak of the carrier). Consequently, it is possible to adjust the phase of the second PWM carrier to match the phase of the first PWM carrier.

In the first embodiment, the amplitude adjusting unit 113c of the master inverter M' adjusts, according to the second data received by the communication unit 112, the amplitude of the first voltage command to substantially equalize the amplitude of the actual output voltage output from the master inverter to the motor and the amplitude of the actual output voltage output from the slave inverter to the motor. Consequently, it is possible to adjust the amplitude of the first voltage command to balance the actual output current output from the master inverter to the motor and the actual output current output from the slave inverter to the motor.

In the first embodiment, the communication unit 112 of the master inverter M' includes the actual output current output from the master inverter to the motor in the first data and broadcast-transmits the first data. When the first data is received by the communication unit 122, the amplitude adjusting unit 123c of the slave inverter S' adjusts, according to the received first data, the amplitude of the second voltage command to balance the actual output current output from the master inverter to the motor and the actual output current output from the slave inverter to the motor. Consequently, it is possible to further reduce an amplitude shift between the first voltage command and the second voltage command.

In the first embodiment, the transmission of the first data by the communication unit 112 of the master inverter M' and the transmission of the second data by the communication unit 122 of the slave inverter S' are alternately performed at each half period of the first PWM carrier and the second PWM carrier. Consequently, the communication unit 112 of the master inverter M' can transmit the first data in synchronization with the first PWM carrier at timing for avoiding transmission timing of the communication unit 122 of the slave inverter S'. The communication unit 122 of the slave inverter S' can transmit the second data in synchronization with the second PWM carrier at timing for avoiding transmission timing of the communication unit 112 of the master inverter M'. That is, it is possible to perform the transmission of the first data by the communication unit 112 of the master inverter M' and the transmission of the second data by the communication unit 122 of the slave inverter S' in a time division manner.

In the first embodiment, the communication unit 112 of the master inverter M' transmits the first data in synchronization with the first phase (e.g., the peak of the carrier) of the first PWM carrier. The communication unit 122 of the slave inverter S' transmits the second data in synchronization with the second phase (e.g., the valley of the carrier) of the second PWM carrier. Consequently, it is possible to perform the transmission of the first data by the communication unit 112 of the master inverter M' and the transmission of the second data by the communication unit 122 of the slave inverter S' in a time division manner. It is possible to avoid collision (data collision) of the first data and the second data in the half-duplex communication line 30. When the first data is transmitted from the master inverter M' to the slave inverter S', it is possible to prevent occurrence of a time lag between transmission timing on the master inverter M' side and reception timing on the slave inverter S' side. That is, the slave inverter S' can receive the first data, which is transmitted from the master inverter M', on a real time basis through the half-duplex communication line 30. Therefore, it is possible to match the phase of the first PWM carrier and the phase of the second PWM carrier.

Second Embodiment

An inverter system 200 according to a second embodiment is explained. Differences from the first embodiment are mainly explained below.

In the explanation in the first embodiment, one slave inverter S' is connected to the motor M in parallel to the master inverter M' via the common connection node CN. In the explanation in the second embodiment, a plurality of slave inverters S'-1 to S'-3 are connected to the motor M in parallel to the master inverter M' via the common connection node CN.

Figure 5:
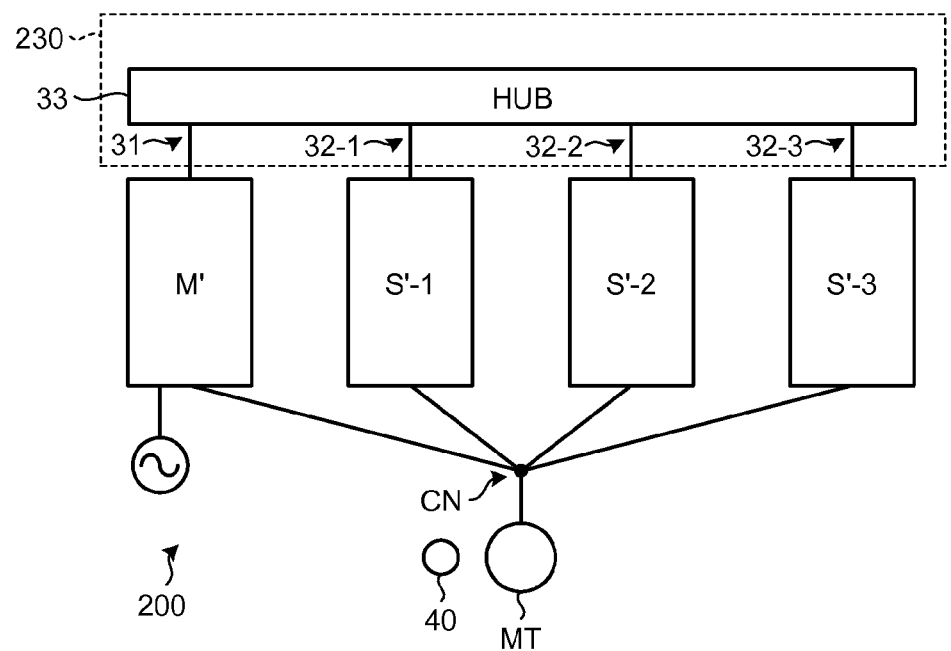
FIG. 5 is a diagram of the configuration of the inverter system according to a second embodiment.

For example, in the inverter system 200, as shown in FIG. 5, a plurality of (e.g., three) slave inverters S'-1 to S'-3 are connected to the motor M in parallel to the master inverter M' via the common connection node CN. According to the connection, for example, the computing unit 13*a* (see FIG. 1) of the master inverter M' divides the total current command I* by a total number (e.g., four) of the master inverter M' and the slave inverters S'-1 to S'-3 and divides the total current command I* into a current command I*$_M$ for the master inverter M' and a current command I*$_S$ for the slave inverters S'-1 to S'-3. The control unit 113 of the master inverter M' includes, in first data that should be transmitted to the slave inverters S'-1 to S'-3, information that associates identifiers of the slave inverts S'-1 to S'-3 and the current command I*$_S$ with respect to the slave inverters S'-1 to S'-3 and includes the actual output current I$_M$ output from the master inverter M' to the motor MT in the first data as well.

A half-duplex communication line 230 includes three communication lines 32-1 to 32-3 that connect the hub 33 and the three slave inverters S'-1 to S'-3. As in the first embodiment, the communication unit 112 of the master inverter M' broadcast-transmits the first data to the half-duplex communication line 230 in synchronization with the first phase (e.g., the peak of the carrier) of the first PWM carrier (see FIG. 6). Consequently, phase adjusting units 124*c* of the slave inverters S'-1 to S'-3 can simultaneously receive the first data and simultaneously adjust, according to reception timing of the first data, the phase of the second PWM carrier to match the phase of the first PWM carrier.

Figure 6:
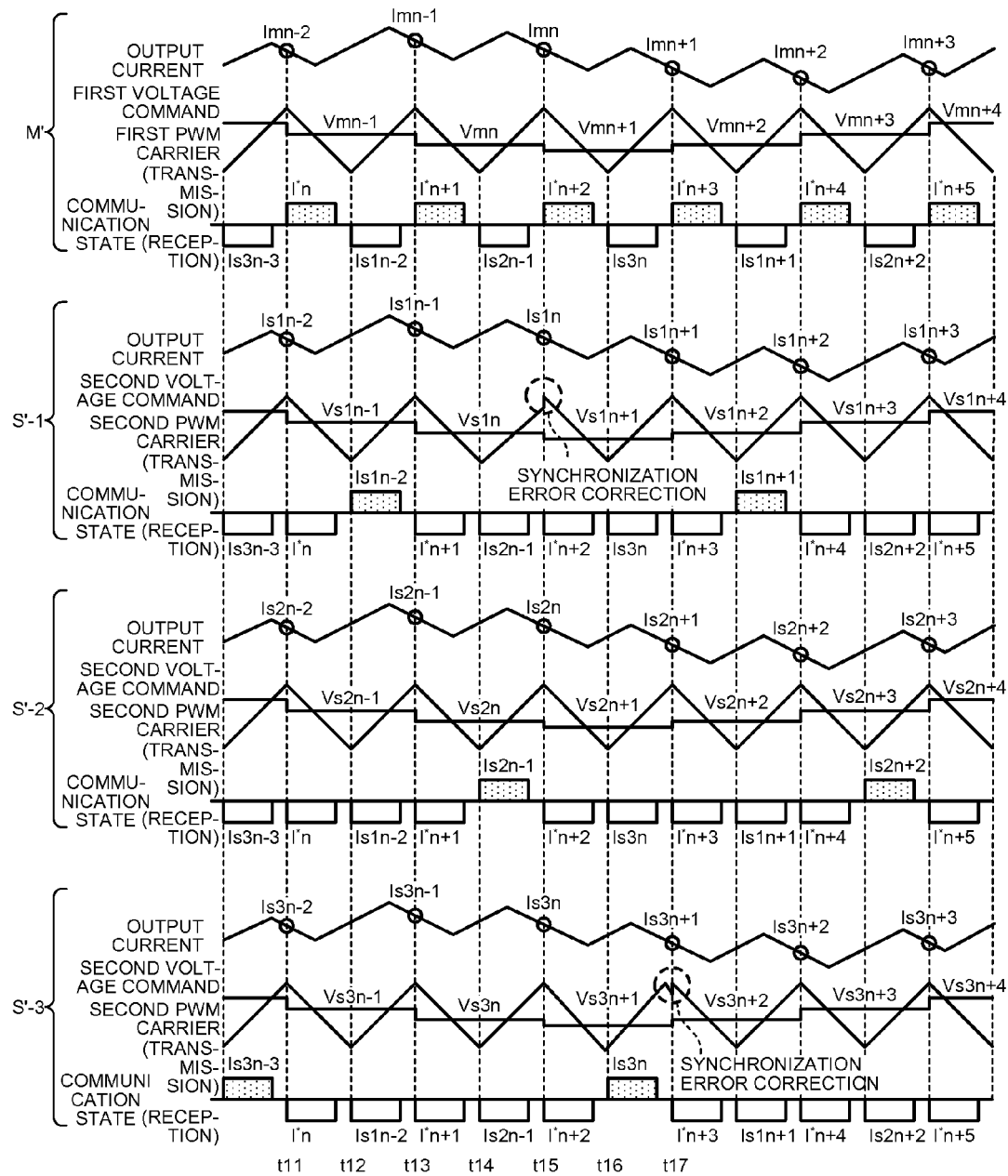
FIG. 6 is a diagram of the operation of the inverter system according to the second embodiment.

As in the first embodiment, communication units 122 of the slave inverters S'-1 to S'-3 broadcast-transmit the second data to the half-duplex communication line 230 in synchronization with the second phase (e.g., the valley of the carrier) of the second PWM carrier (see FIG. 6). However, because collision is likely to occur if the slave inverts S'-1 to S'-3 simultaneously perform transmission, it is necessary to allocate a transmission right to any one of the slave inverters S'-1 to S'-3.

Therefore, the control unit 113 of the master inverter M' allocates a transmission right to any one of the slave inverters S'-1 to S'-3, further includes information for designating the transmission right in the first data, and supplies the first data to the communication unit 112. The communication unit 112 broadcast-transmits the first data including the information that associates the identifiers of the slave inverters S'-1 to S'-3 and the current command I*$_S$ with respect to the slave inverters S'-1 to S'-3, the actual output current I$_M$ output from the master inverter M' to the motor MT, and the information for designating the transmission right to the half-duplex communication line 230 in synchronization with the first phase of the first PWM carrier. Consequently, any one of the slave inverters S'-1 to S'-3 that receives the first data can determine whether the inverter has the transmission right.

For example, in FIG. 6, when, at timing t11, the master inverter M' broadcast-transmits first data "I*n" for designating the transmission right for the slave inverter S'-1, at timing t12, the slave inverter S'-1 broadcast-transmits second data "I$_S$1n−2" including the actual output current I$_S$ output from the slave inverter S'-1 to the motor MT. When, at timing t13, the master inverter M' broadcast-transmits first data "I*n+1" for designating the transmission right for the slave inverter S'-2, at timing t14, the slave inverter S'-2 broadcast-transmits second data "I$_S$2n−1" including the actual output current I$_S$ output from the slave inverter S'-2 to the motor MT. When, at timing t15, the master inverter M' broadcast-transmits first data "I*n+2" for designating the transmission right for the slave inverter S'-3, at timing t16, the slave inverter S'-3 broadcast-transmits second data "I$_S$3n" including the actual output current I$_S$ output from the slave inverter S'-3 to the motor MT. At timing t17, the master inverter M' broadcast-transmits the first data "I*n" for designating the transmission right for the slave inverter S'-1 again.

As explained above, the transmission of the second data by the communication units 122 of the slave inverters S'-1 to S'-3 is performed in a round robin manner over a plurality of periods (in the case of FIG. 6, three periods) of the second PWM carrier.

For example, when second data of the slave inverter S'-1 is received by the communication unit 112, the amplitude adjusting unit 113*c* of the master inverter M' recognizes, according to the second data, the actual output current I$_S$ output from the slave inverter S'-1 to the motor MT and retains the actual output current I$_S$ output from the slave inverter S'-2 to the motor MT and the actual output current I$_S$ output from the slave inverter S'-3 to the motor MT recognized last time. The amplitude adjusting unit 113*c* adjusts the first voltage command CV1 to balance the actual output current I$_M$ output from the master inverter M' to the motor MT and the actual output current I$_S$ output from any one of the slave inverters S'-1 to S'-3 to the motor MT.

For example, when second data of another slave inverter S'-1 is received by the communication unit 122, the amplitude adjusting unit 123*c* of the slave inverter S'-2 recognizes, according to the second data, the actual output current I$_S$ output from the slave inverter S'-1 to the motor MT and retains the actual output current I$_M$ output from the master inverter M' to the motor MT and the actual output current I$_S$ output from the slave inverter S'-3 to the motor MT recognized last time. The amplitude adjusting unit 123*c* adjusts the second voltage command CV2 to balance the actual output current I$_M$ output from the master inverter M' to the motor MT and the actual output current I$_S$ output from any one of the slave inverters S'-1 to S'-3 to the motor MT.

Figure 7:
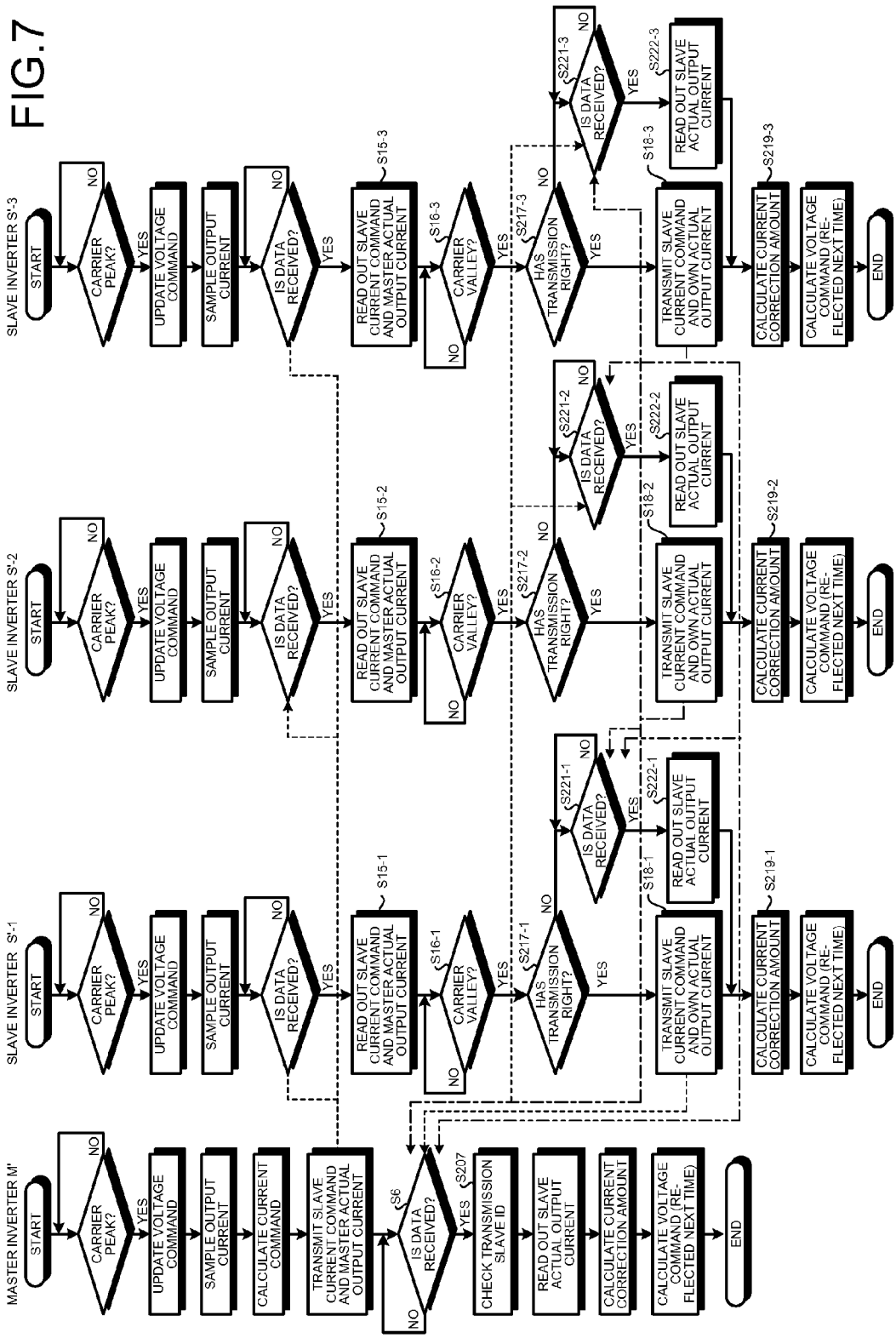
FIG. 7 is a diagram of the operation of the inverter system according to the second embodiment.

As shown in FIG. 7, the operation of the inverter system 200 is different from the operation of the inverter system in the first embodiment in points explained below.

Each of the slave inverters S'-1 to S'-3 stays on standby ("N" at steps S16-1 to S16-3) until the phase of second PWM carrier changes to the second phase (e.g., the valley of the carrier). When the phase of the second PWM carrier changes to the second phase (e.g., the valley of the carrier) ("Y" at each of steps S16-1 to S16-3), each of the slave inverters S'-1 to S'-3 determines, according to the first data received at the immediately preceding timing, whether the slave inverter has the transmission right. When each of the slave inverters S'-1 to S'-3 has the transmission right ("Y" at each of steps S217-1 to S217-3), the slave inverter broadcast-transmits the second data to the half-duplex communication line 230 (each of steps S18-1 to S18-3). When each of the slave inverters S'-1 to S'-3 does not have the transmission right ("N" at each of steps S217-1 to S217-3), the slave inverter stays on standby ("N" at each of steps S221-1 to S221-3) until the second data is received. Upon receiving the second data ("Y" at each of steps S221-1 to S221-3), each of the slave inverters S'-1 to S'-3 reads out, from the second data, the actual output current I$_S$ output from each of the slave inverters S'-1 to S'-3 at a transmission source to the motor MT (each of steps S222-1 to S222-3). Then, each of the slave inverters S'-1 to S'-3 calculates, according to the current command I*$_S$ for the slave inverter S' read out at step S15, the actual output current I$_S$ output from the others of the slave inverters S'-1 to S'-3 to the motor MT read out at the others of steps S222-1 to S222-3, and the actual output current I$_M$ output from the master inverter M' to the motor MT, a current correction amount for adjusting the second voltage command to balance the actual output current $I_M$ output from the master inverter M' and the actual output current $I_S$ output from each of the slave inverters S'-1 to S'-3 to the motor MT (each of steps S219-1 to S219-3).

On the other hand, upon receiving the second data ("Y" at step S6), the master inverter M' checks an identifier (ID) of each of the slave inverters S'-1 to S'-3 to which the second data should be transmitted next and sets the identifier (ID) in the information for designating the transmission right (step S207).

As explained above, in the second embodiment, the communication unit 112 of the master inverter M' broadcast-transmits, in synchronization with the first PWM carrier, the first data including the current command to the half-duplex communication line 230. The communication units 122 of the slave inverters S'-1 to S'-3 receive the first data through the half-duplex communication line 230. The phase adjusting units 124c of the slave inverters S'-1 to S'-3 simultaneously adjust, according to the reception timing of the first data, the phase of the second PWM carrier to match the phase of the first PWM carrier. Consequently, when there are a plurality of slave inverters, it is possible to simultaneously reduce a phase shift between the first PWM carrier and a plurality of second PWM carriers.

In the second embodiment, the communication units 122 of the slave inverters S'-1 to S'-3 broadcast-transmit, in synchronization with the second PWM carrier, the second data including the actual output current output from the slave inverters to the motor to the half-duplex communication line 230 at timing for avoiding the reception timing of the first data. When the second data is received by the communication unit 112, the amplitude adjusting unit 113c of the master inverter M' adjusts, according to the received second data, the amplitude of the first voltage command to balance the actual output current output from the master inverter to the motor and the actual output current output from the slave inverters to the motor. Consequently, when there are a plurality of slave inverters, it is possible to reduce an amplitude shift between the first voltage command and the second voltage command.

In the second embodiment, the communication unit 122 of each of the slave inverters S'-1 to S'-3 receives the second data from the others of the slave inverters S'-1 to S'-3 through the half-duplex communication line 230. The amplitude adjusting unit 123c of each of the slave inverters S'-1 to S'-3 adjusts, according to the first data and the second data of the others of the slave inverters S'-1 to S'-3, the second voltage command to balance the actual output current output from the master inverter to the motor and the actual output current output from each of the slave inverters S'-1 to S'-3 to the motor. Consequently, when there are a plurality of slave inverters, it is possible to reduce an amplitude shift between the first voltage command and the second voltage command.

In the second embodiment, when there are a plurality of slave inverters, it is possible to simultaneously reduce phase shifts between the first PWM carrier and a plurality of second PWM carriers and reduce an amplitude shift between the first voltage command and the second voltage command. Consequently, when there are a plurality of slave inverters, it is possible to suppress a cross current between the master inverter M' and the slave inverters S'-1 to S'-3.

In the second embodiment, the transmission of the second data by the communication units 122 of the slave inverters S'-1 to S'-3 is performed in a round robin manner over a plurality of periods of the second PWM carrier. Consequently, when there are a plurality of slave inverters, it is possible to perform the transmission of the second data by the communication units 122 of the slave inverters S'-1 to S'-3 in a time division manner and avoid collision (data collision) of a plurality of second data in the half-duplex communication line 230. That is, each of the slave inverters S'-1 to S'-3 can receive the second data, which is transmitted from the others of the slave inverters S'-1 to S'-3, on a real time basis through the half-duplex communication line 230. Therefore, it is possible to reduce an amplitude shift between the first voltage command and the second voltage command substantially on a real time basis.

Third Embodiment

An inverter system according to a third embodiment is explained. Differences from the second embodiment are mainly explained below.

In the second embodiment, while the transmission of the first data by the communication unit 112 of the master inverter M' and the transmission of the second data by the communication units 122 of the slave inverters S'-1 to S'-3 are maintained to be alternately performed at each half period of the first PWM carrier and the second PWM carrier, the transmission of the second data by the communication units 122 of the slave inverters S'-1 to S'-3 is performed in a round robin manner over a plurality of periods of the second PWM carrier.

On the other hand, in the third embodiment, the transmission of the first data by the communication unit 112 of the master inverter M' and the transmission of the second data by the communication units 122 of a plurality of slave inverters S' are performed in a round robin manner at a half period unit of the first PWM carrier and the second PWM carrier.

Figure 8:
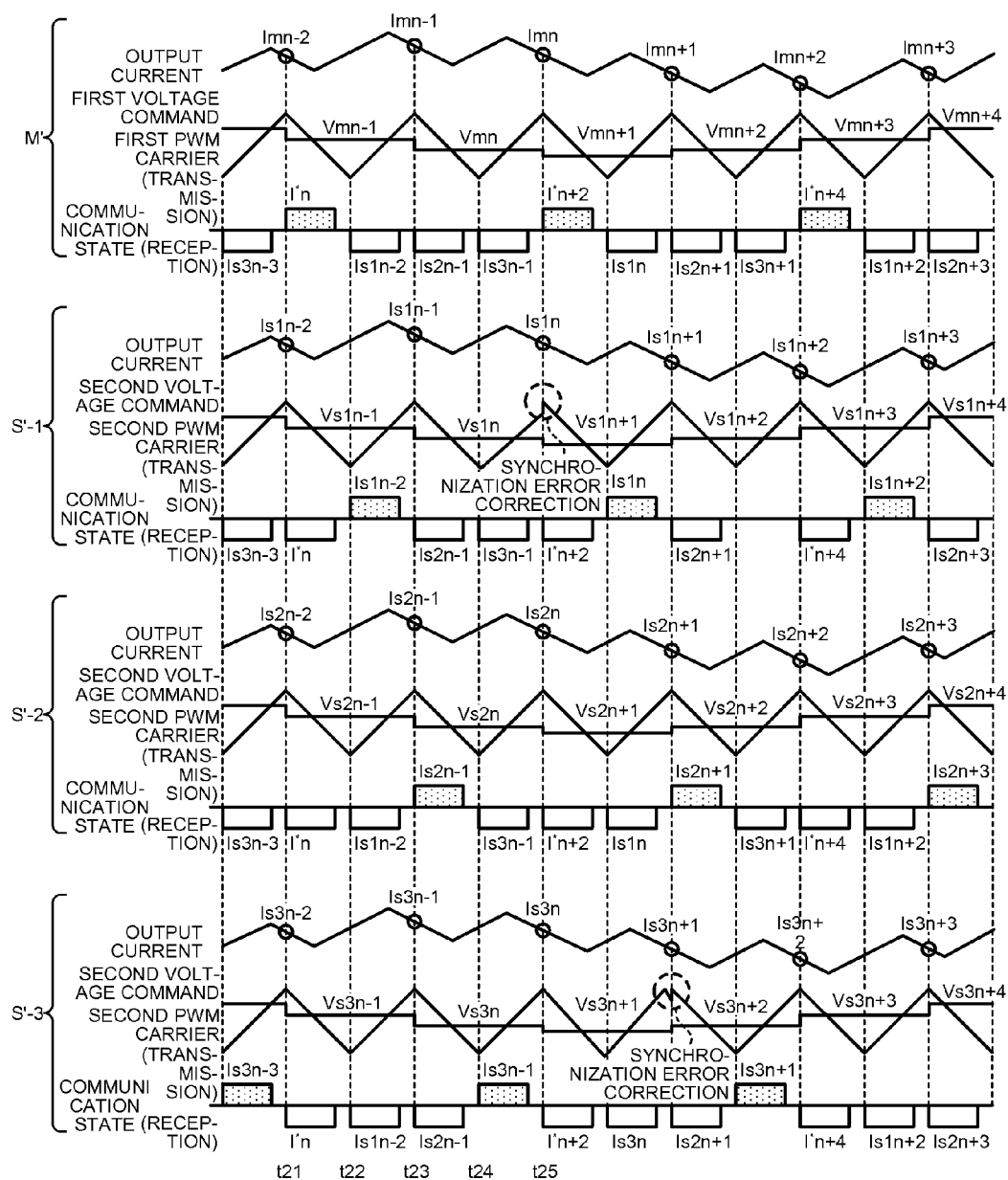
FIG. 8 is a diagram of the operation of an inverter system according to a third embodiment.

For example, in FIG. 8, when, at timing t21, the master inverter M' broadcast-transmits first data "I*n" for designating a transmission right for the slave inverter S'-1, at timing t22, the slave inverter S'-1 broadcast-transmits second data "$I_S$1n−2" including the actual output current $I_S$ output from the slave inverter S'-1 to the motor MT and information for designating the transmission right for the slave inverter S'-2. At timing t23, the slave inverter S'-2 broadcast-transmits second data "$I_S$2n−1" including the actual output current $I_S$ output from the slave inverter S'-2 to the motor MT and information for designating the transmission right for the slave inverter S'-3. At timing t24, the slave inverter S'-3 broadcast-transmits second data "$I_S$3n−1" including the actual output current $I_S$ output from the slave inverter S'-3 to the motor MT and information for designating the transmission right for the master inverter M'.

As explained above, in the third embodiment, the transmission of the first data by the communication unit 112 of the master inverter M' and the transmission of the second data by the communication units 122 of the slave inverters S'-1 to S'-3 are performed in a round robin manner alternately in synchronization with the first phase and the second phase of the first PWM carrier and the second PWM carrier. At this point, periods of one cycle of the round robin can be set shorter (e.g., in the case of FIG. 8, two periods) than periods in the second embodiment (e.g., in the case of FIG. 6, three periods). Therefore, it is possible to reduce a period of time until each of the inverters acquires actual output currents of all the inverters and reduce an amplitude shift between the first voltage command and the second voltage command substantially on a real time basis.

INDUSTRIAL APPLICABILITY

As explained above, the inverter system and the communication method according to the present invention are useful for driving of a motor.

REFERENCE SIGNS LIST 1 inverter system
11 driving unit
12 communication unit
13 control unit
13a computing unit
13b converting unit
14 PWM generating unit
14a PWM-carrier generating unit
14b comparing unit
15 communication timing counter
21 driving unit
22 communication unit
23 control unit
23b converting unit
24 PWM generating unit
24a PWM-carrier generating unit
24b comparing unit
25 communication timing counter
30 half-duplex communication line
40 speed sensor
100 inverter system
112 communication unit
113 control unit
113c amplitude adjusting unit
116 current sensor
122 communication unit
123 control unit
123c amplitude adjusting unit
124 PWM generating unit
124c phase adjusting unit
126 current sensor
200 inverter system
230 half-duplex communication line

The invention claimed is:

1. An inverter system comprising:
a master inverter connected to a motor; and
one or more slave inverters connected to the master inverter via a half-duplex communication line and each connected to the motor in parallel to the master inverter via a common communication node, wherein
the master inverter includes:
a driving unit configured to drive the motor based on a first PWM carrier and a first voltage command; and
a communication unit configured to broadcast-transmit first data including a current command to the half-duplex communication line in synchronization with the first PWM carrier,
each of the one or more slave inverters includes:
a driving unit configured to drive the motor based on a second PWM carrier and a second voltage command;
a communication unit configured to receive the first data through the half-duplex communication line and broadcast-transmit, in synchronization with the second PWM carrier at timing for avoiding reception timing of the first data, second data including an actual output current output from the slave inverter to the motor to the half-duplex communication line; and
a phase adjusting unit configured to adjust, according to the reception timing of the first data, a phase of the second PWM carrier to match a phase of the first PWM carrier, and
the master inverter further includes an amplitude adjusting unit configured to adjust, when the second data is received by the communication unit, amplitude of the first voltage command according to the received second data, so as to balance an actual output current output from the master inverter to the motor and an actual output current output from each of the one or more slave inverters to the motor.

2. The inverter system according to claim 1, wherein
the communication unit of the master inverter broadcast-transmits the first data to the half-duplex communication line in synchronization with a first phase in the first PWM carrier,
the phase adjusting unit of each of the one or more slave inverters adjusts, according to the reception timing of the first data, the phase of the second PWM carrier to be the first phase, and
the amplitude adjusting unit of the master inverter adjusts, according to the received second data, the amplitude of the first voltage command to equalize amplitude of an actual output voltage output from the master inverter to the motor and amplitude of an actual output voltage output from each of the one or more slave inverters to the motor.

3. The inverter system according to claim 1, wherein
the communication unit of the master inverter further includes, in the first data, the actual output current output from the master inverter to the motor and broadcast-transmits the first data, and
each of the one or more slave inverters further includes an amplitude adjusting unit configured to adjust amplitude of the second voltage command according to the received first data.

4. The inverter system according to claim 1, wherein
the one or more slave inverters are a plurality of slave inverters,
the communication unit of each of the slave inverters receives, through the half-duplex communication line, the second data from the other slave inverters other than the slave inverter itself among the slave inverters, and
each of the slave inverters further includes an amplitude adjusting unit configured to adjust amplitude of the second voltage command according to the received second data.

5. The inverter system according to claim 1, wherein
the communication unit of the master inverter transmits the first data in synchronization with a first phase of the first PWM carrier, and
the communication unit of the slave inverter transmits the second data in synchronization with a second phase of the second PWM carrier.

6. The inverter system according to claim 5, wherein
the one or more slave inverters are a plurality of slave inverters, and
transmission of the second data by the communication units of the slave inverters is performed in a round robin manner over a plurality of periods of the second PWM carrier.

7. The inverter system according to claim 1, wherein
the one or more slave inverters are a plurality of slave inverters, and
transmission of the first data by the communication unit of the master inverter and transmission of the second data by communication units of the slave inverters are performed in a round robin manner alternately in synchronization with a first phase and a second phase of the first PWM carrier and the second PWM carrier.

8. A communication method in an inverter system including a master inverter connected to a motor and a plurality of slave inverters connected to the master inverter via a half-duplex communication line and each connected to the motor in parallel to the master inverter via a common communication node, the communication method comprising:
- a first transmission step in which the master inverter configured to drive the motor based on a first PWM carrier and a first voltage command broadcast-transmits first data including a current command to the half-duplex communication line in synchronization with the first PWM carrier;
- a first reception step in which each of the slave inverters configured to drive the motor based on a second PWM carrier having a period substantially same as a period of the first PWM carrier and a second voltage command receives the first data transmitted in the first transmission step;
- a phase adjusting step in which each of the slave inverters adjusts, according to reception timing of the first data in the first reception step, a phase of the second PWM carrier to match a phase of the first PWM carrier;
- an allocating step of allocating a transmission right to any one of the slave inverters;
- a second transmission step in which the slave inverter allocated with the transmission right in the allocating step broadcast-transmits, in synchronization with the second PWM carrier, second data including an actual output current output from the slave inverter to the motor to the half-duplex communication line at timing for avoiding the reception timing of the first data in the first reception step;
- a second reception step in which each of the master inverter and the slave inverters not allocated with the transmission right in the allocating step receives the second data through the half-duplex communication line; and
- an amplitude adjusting step in which each of the master inverter and the slave inverters not allocated with the transmission right in the allocating step adjusts amplitude of the first voltage command and amplitude of the second voltage command so as to balance an actual output current output from the master inverter to the motor and an actual output current output from each of the slave inverters to the motor.

9. The communication method according to claim 8, wherein
the first transmission step and the second transmission step are alternately performed at each half period of the first PWM carrier and the second PWM carrier.

10. The communication method according to claim 8, wherein
the first transmission step by the master inverter and a plurality of the second transmission steps by the slave inverters are performed in a round robin manner in a half period unit of the first PWM carrier and the second PWM carrier.

* * * * *